US012591064B2

(12) United States Patent
Baldan et al.

(10) Patent No.: US 12,591,064 B2
(45) Date of Patent: Mar. 31, 2026

(54) METHODS AND SYSTEMS FOR SENSOR OPERATION

(71) Applicant: Motional AD LLC, Boston, MA (US)

(72) Inventors: Giancarlo Baldan, Somerville, MA (US); Timothy O'Donnell, West Newton, MA (US); William Buono, Pittsburgh, PA (US)

(73) Assignee: Motional AD LLC, Boston, MA (US)

( * ) Notice: Subject to any disclaimer, the term of this patent is extended or adjusted under 35 U.S.C. 154(b) by 982 days.

(21) Appl. No.: 17/697,967

(22) Filed: Mar. 18, 2022

(65) Prior Publication Data

US 2023/0296780 A1 Sep. 21, 2023

(51) Int. Cl.
| *G01S 17/931* | (2020.01) |
| *B60W 50/06* | (2006.01) |
| *B60W 60/00* | (2020.01) |

(52) U.S. Cl.
CPC .......... *G01S 17/931* (2020.01); *B60W 50/06* (2013.01); *B60W 60/001* (2020.02); *B60W 2420/408* (2024.01)

(58) Field of Classification Search
CPC ... G01S 17/931; B60W 60/001; B60W 50/06; B60W 2420/408
See application file for complete search history.

(56) References Cited

U.S. PATENT DOCUMENTS

| 2009/0312906 A1 | 12/2009 | Bauer et al. |
| 2019/0011538 A1* | 1/2019 | Schwarz ............... G01S 7/4817 |

| 2020/0064483 A1 | 2/2020 | Li et al. |
| 2021/0024096 A1 | 1/2021 | Wang et al. |
| 2021/0223373 A1* | 7/2021 | Korobkin .............. G01S 17/931 |
| 2022/0291387 A1* | 9/2022 | Pacala ................... G01S 7/4817 |
| 2023/0243977 A1* | 8/2023 | Buoniconti, IV ....... G01S 17/42 356/4.01 |

FOREIGN PATENT DOCUMENTS

| CN | 108639065 | 12/2018 |
| DE | 102011080720 | 2/2013 |
| EP | 3422050 | 6/2018 |
| EP | 3422049 | 1/2019 |
| KR | 1020160066763 A * | 6/2016 |

OTHER PUBLICATIONS

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.
Great Britain Office Action issued for Application No. GB 2204712. 0, dated Sep. 29, 2022.
Korean Office Action issued for Application No. KR 10-2022-0052079, dated Jun. 28, 2023.
Korean Notice of Allowance issued for Application No. KR 10-2022-0052079, dated Jun. 21, 2024.

* cited by examiner

*Primary Examiner* — Jay Khandpur
(74) *Attorney, Agent, or Firm* — Knobbe, Martens, Olson & Bear, LLP

(57) ABSTRACT

Provided are methods for sensor operation, which can include obtaining first location data of a first sensor associated with an autonomous vehicle and determining a first position parameter and a first configuration parameter of the first sensor. Some methods described also include operating the first sensor based on the first configuration parameter. Systems and computer program products are also provided.

18 Claims, 9 Drawing Sheets

702

Obtain first location data

704

Determine a first position parameter

706

Determine a first configuration parameter

708

Operate the first sensor

700

METHODS AND SYSTEMS FOR SENSOR OPERATION

BACKGROUND

Autonomous vehicles can utilize multiple sensors mounted around the vehicle in order to ensure coverage and provide the autonomous system situational awareness of the environment. This is a challenge for sensors because each side of the vehicle is a different shape, and the sensors are mounted at different heights and orientations due to limited options for mounting on the vehicle. The limited mounting options force to mount custom sensors in each position of the vehicle in order to achieve sensor field of view requirements.

DETAILED DESCRIPTION

Figure 1:
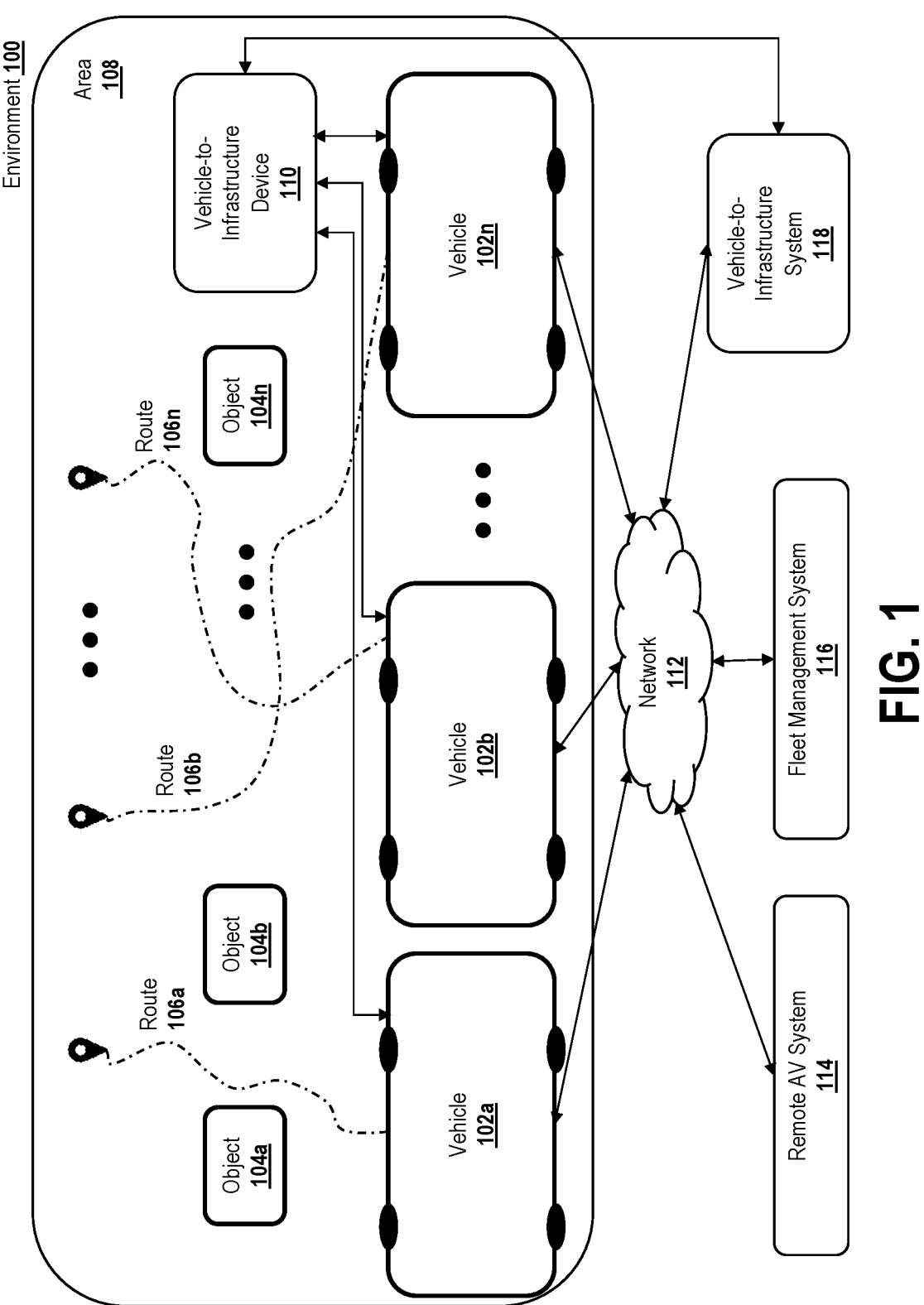
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

"At least one," and "one or more" includes a function being performed by one element, a function being performed by more than one element, e.g., in a distributed fashion, several functions being performed by one element, several functions being performed by several elements, or any combination of the above."

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement a process for sensor operation. For example, systems, methods, and computer program products described herein can determine position and/or location parameters for aligning, such as synchronizing, different sensors.

By virtue of the implementation of systems, methods, and computer program products described herein, techniques for process sensor operation include improving the accuracy and coverage of sensors around an autonomous vehicle, especially in the vertical field. Further advantages include improved synchronization of sensors on an autonomous vehicle, which may improve accuracy and may reduce issues in data flows, in both standard and inverted positions. Additional advantages include aligning high resolution fields of view in order to provide more robust sensor coverage for an autonomous vehicle.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

Figure 7:
FIG. 7 is a flowchart of an example process for sensor operation.
Figure 7:
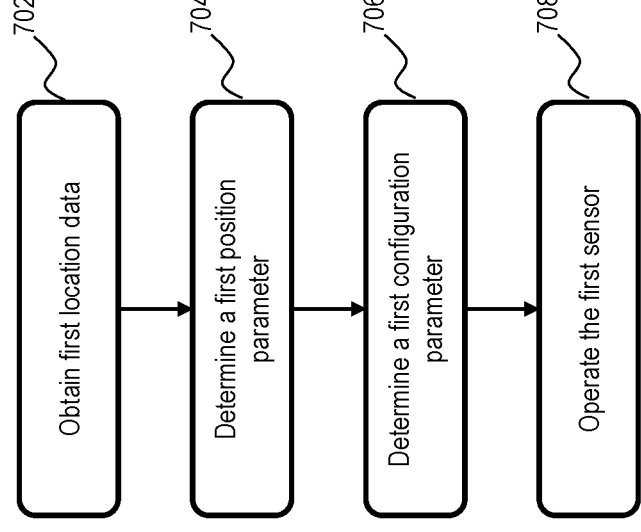

In some embodiments, device 300 is configured to execute software instructions of one or more steps of the disclosed method, as illustrated in FIG. 7.

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
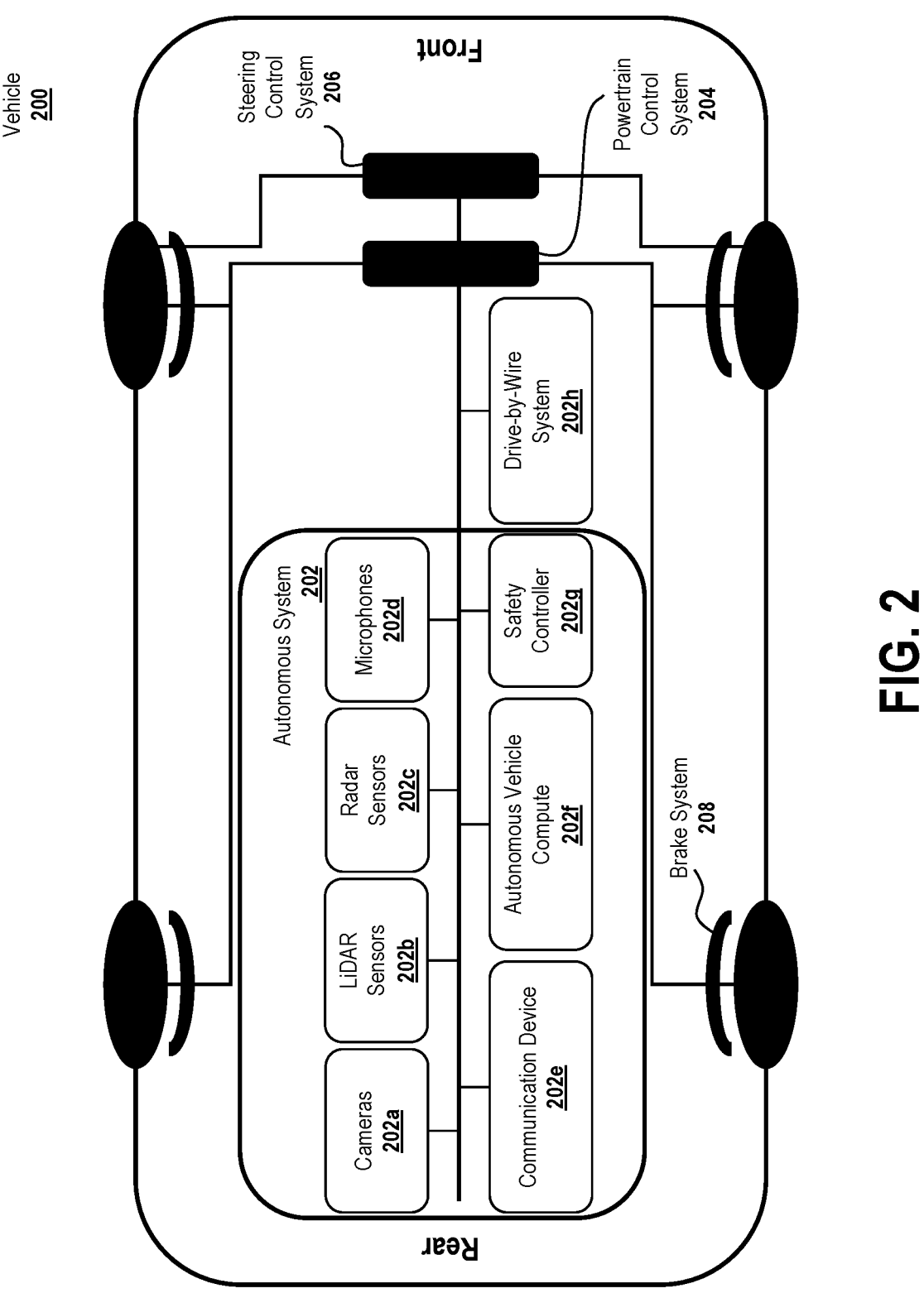
FIG. 2 is a diagram of one or more example systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 200 has autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and safety controller 202g.

Figure 3:
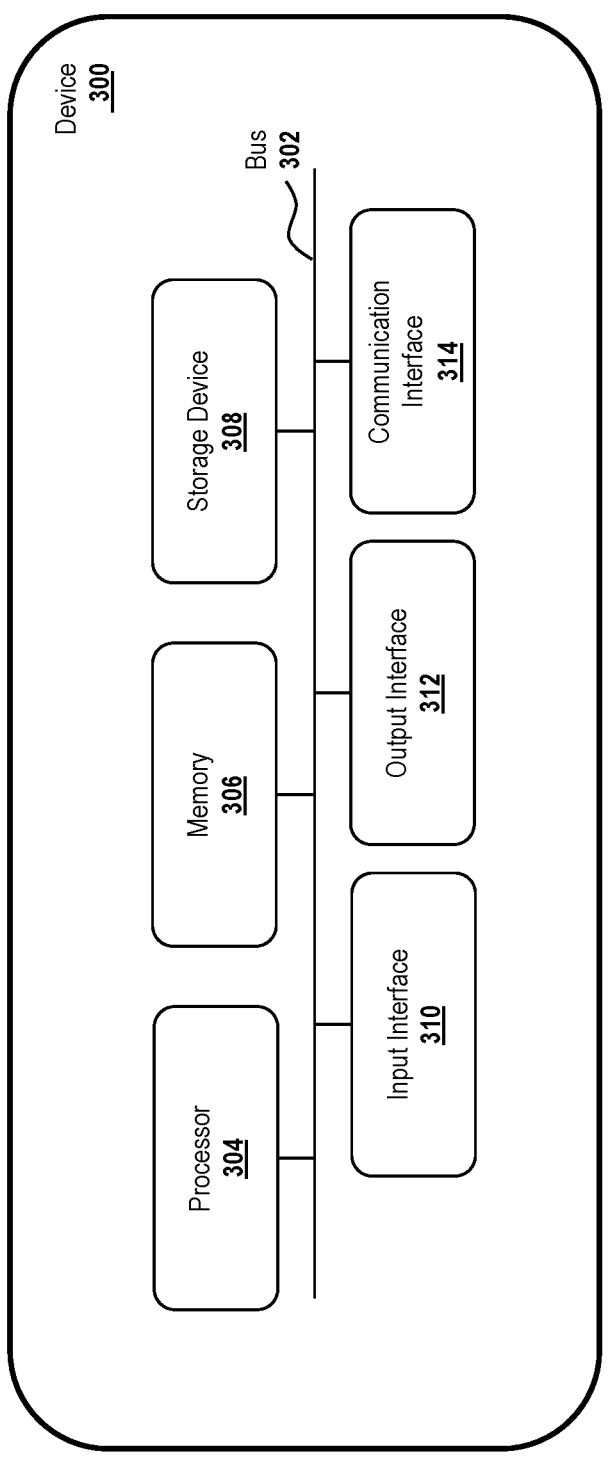
FIG. 3 is a diagram of components of one or more example devices and/or one or more example systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202 is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), at least one device of remote AV system 114, fleet management system 116, V2I system 118, and/or one or more devices of network 112 (e.g., one or more devices of a system of network 112). In some embodiments, one or more devices of vehicles 102 (e.g., one or more devices of a system of vehicles 102 such as at least one device of remote AV system 114, fleet management system 116, and V2I system 118, and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
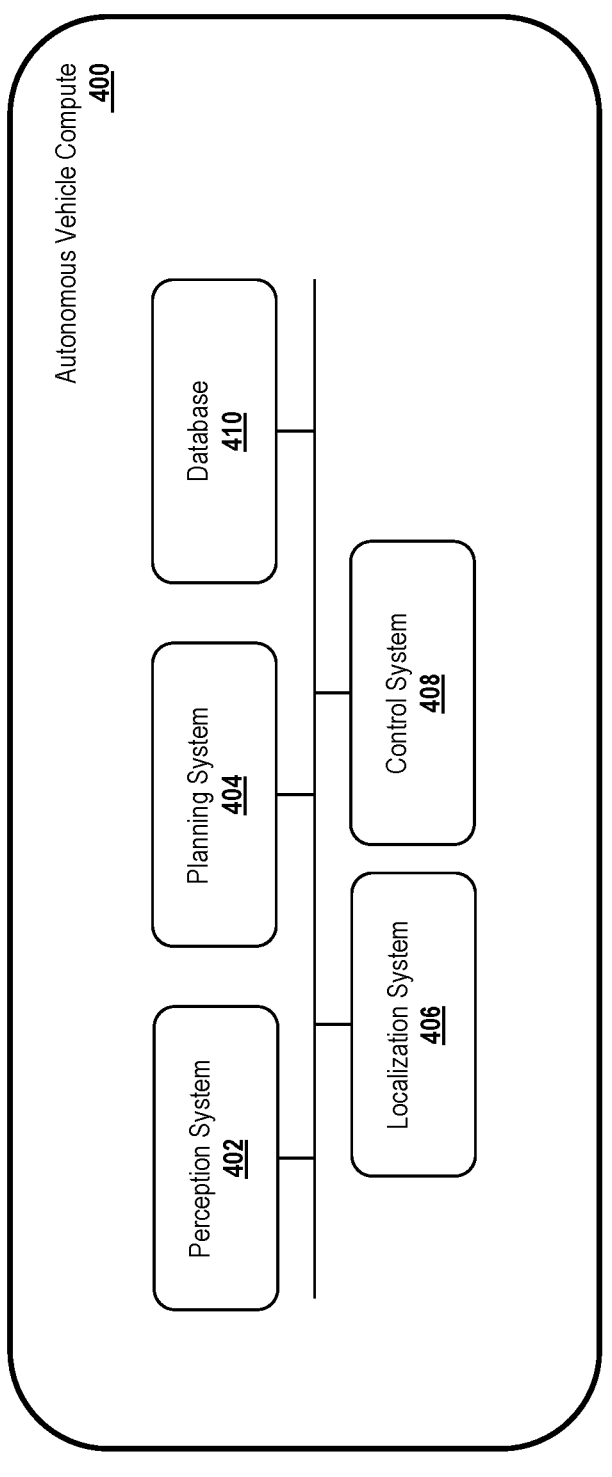
FIG. 4 is a diagram of certain components of an example autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

The present disclosure relates to systems, methods, and computer program products that provide for distributed short range lidar systems. The disclosed systems, methods, and computer program products can be configured to provide close sensor coverage of an autonomous vehicle in both the horizontal and the vertical direction. Further, the disclosed systems, methods, and computer program products can allow for synchronization of sensors, such as LIDAR sensors, in both standard and inverted positions.

Figure 5:
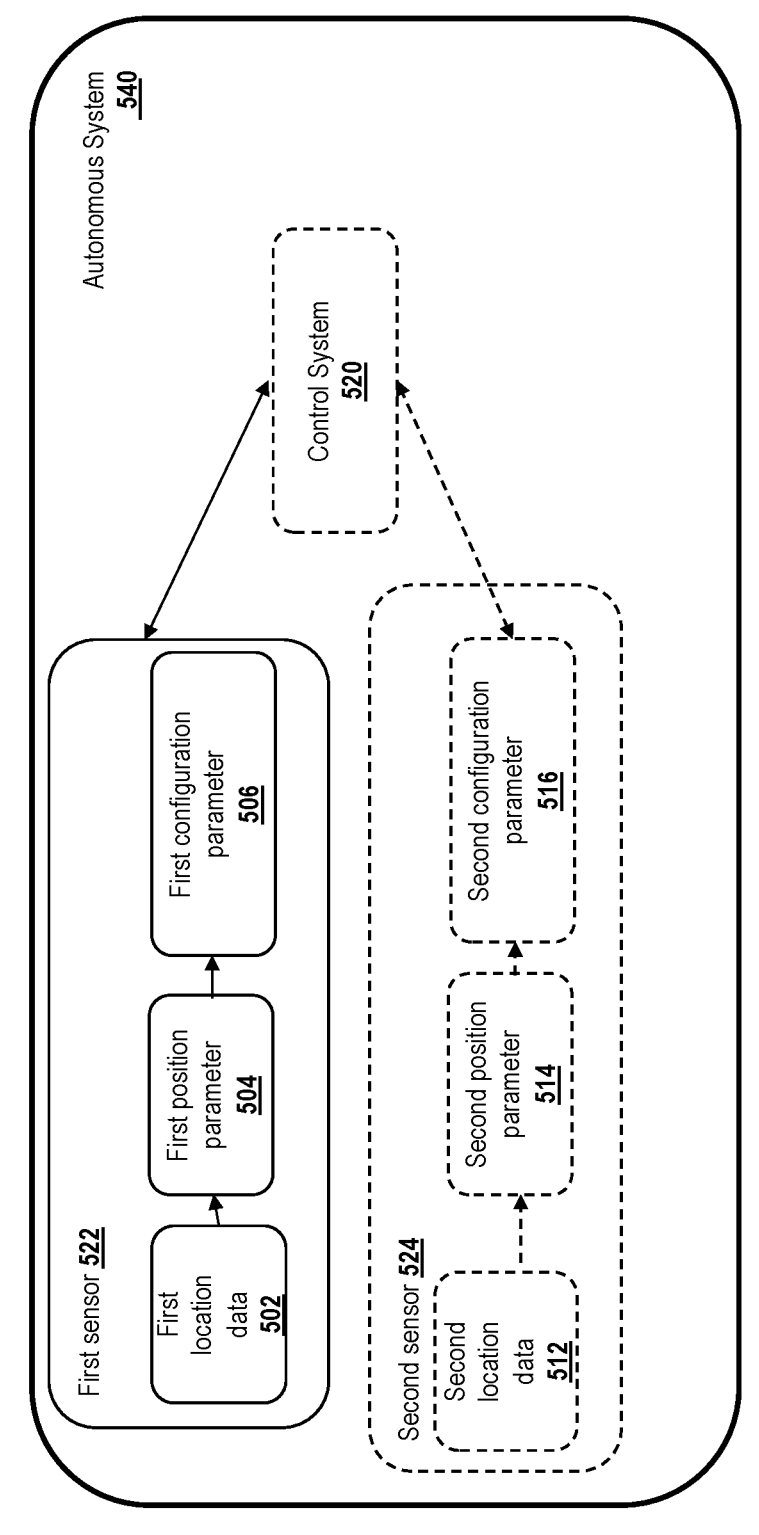
FIG. 5 is a diagram of an example implementation of a process for sensor operation.

Referring now to FIG. 5, illustrated is a diagram of an implementation 500 of a process for sensor operation. In some embodiments, implementation 500 includes an autonomous system 540 (such as autonomous system 202 of FIG. 2), and a vehicle (similar to vehicle 200 of FIG. 2, such as an autonomous vehicle). In some embodiments, implementation 500 is the same as or like system, such as an AV (e.g. illustrated in FIGS. 2, 3 and 4), an AV system, a remote AV system, a fleet management system, and a V2I system. The implementation 500, such as the system, can be for operating an autonomous vehicle, such as for supporting an operation of an AV. The implementation 500, such as the system, may not be for operating an autonomous vehicle. The system 500 may be a system of a sensor. The system 500 may be a system of an autonomous vehicle. The system 500 may be a system of the autonomous vehicle compute. The system 500 may include the autonomous system 540 and a first sensor 522, and optionally a second sensor 524. The system 500 may include a control system 520. The control system 520 may be part of an AV compute.

Disclosed herein is a system 500. In one or more embodiments or examples, the system 500 can include at least one processor. In one or more embodiments or examples, the system 500 can include at least one memory storing instructions thereon that, when executed by the at least one processor, cause the at least one processor to obtain first location data 502 of a first sensor 522 associated with an autonomous vehicle. In one or more embodiments or examples, the system 500 can include at least one memory storing instructions thereon that, when executed by the at least one processor, cause the at least one processor to determine, based on the first location data 502, a first position parameter 504 indicative of a vertical orientation of the first sensor 522 with respect to a ground level. In one or more embodiments or examples, the system 500 can include at least one memory storing instructions thereon that, when executed by the at least one processor, cause the at least one processor to determine, based on the first position parameter 504, a first configuration parameter 506 indicative of a configuration of the first sensor 522. In one or more embodiments or examples, the system 500 can include at least one memory storing instructions thereon that, when executed by the at least one processor, cause the at least one processor to operate, based on the first configuration parameter 506, the first sensor 522.

The proper incorporation of one or more sensors, such as the first sensor 522 and/or the second sensor 524, into an autonomous vehicle can be challenging for a number of reasons. For example, sensors can be mounted on an autonomous vehicle at different locations and heights depending on the type of vehicle. Further, there can be sensor field-of-view requirements for proper obtaining of sensor data. Additionally, there can be firing time offset requirements so that the autonomous vehicle can properly obtain sensor data from multiple sensors that can be used. There may be a sequential and/or temporal data flow requirement. These issues have been resolved, or mitigated, by using specialized designed sensors for different locations on an autonomous vehicle. However, the use of specialized sensors can lead to human errors during installation, which can negatively affect the operation of the autonomous vehicle.

Advantageously, the disclosure can reduce and/or eliminate the challenges, such as through the system 500 automatically obtaining location data, such as first location data 502 and/or second location data 512, and determining position parameters, such as first position parameter 504 and/or second position parameter 514, and configuration parameters, such as first configuration parameter 506 and/or second configuration parameter 516, for any sensors. For example, sensors can be interchangeably located on the autonomous vehicle, and the system 500 can automatically properly operate the sensors, such as using control system 520 which can include any or all components of control system 408.

For example, the system 500 can be configured to determine a first position parameter 504 and/or a second position parameter 514 indicative of an inverted position of one or more sensors on a vehicle. The inverted position can allow for a sensor to be tucked into a rear bumper of the autonomous vehicle. The system 500 can be configured to operate a sensor, such as the first sensor 522 and/or second sensor 524, so that a high resolution band is oriented in an ideal location to meet field-of-view and range requirements for sensors on the autonomous vehicle. Due to the inversion, a sensor may have a different spin direction than other sensors of an autonomous vehicle. For example, an inverted sensor may have a counterclockwise spin while other sensors have a clockwise spin. The different spin direction may allow for the system 500 to properly obtain sensor data from the different sensors. For example, the sensors on the autonomous vehicle can all rotate in the same direction. Thus, if a sensor is mounted in an inverted position, it would have the opposite spin as non-inverted sensors, so as to align with the spin direction of the inverter sensors according to the disclosed technique. The system 500 can be configured to operate the one or more sensors, such as a first sensor 522 and/or a second sensor 524, to orient the field-of view and spin for proper operation.

The first location data 502 can be indicative of a position, such as placement and/or location, of the first sensor 522 with respect to the autonomous vehicle. For example, the first location data 502 can be indicative of the component of the autonomous vehicle that the first sensor 522 is located on. The first location data 502 can be a harness code. The first location data 502 can be indicative of a harness code. The first location data 502 can be obtained from a harness code. For example, the first sensor 522 can be attached to the autonomous vehicle at a harness having a harness code.

The system 500 can be configured to obtain the first location data 502 from the autonomous system 540. The system 500 can be configured to obtain the first location data 502 from a harness. The system 500 can be configured to obtain a location harness code for the first sensor 522. The system 500 can determine, such as obtain, the first location data 502 from the harness code. The harness code may be read by the first sensor 522 and provided to the autonomous system by the first sensor 522.

The first sensor, such as first sensor 522 can be one or more sensors, such as a first onboard sensor. The first sensor 522 may be associated with the autonomous vehicle. An autonomous vehicle may include one or more sensors that can be configured to monitor an environment where the autonomous vehicle operates, such as via the first sensor 522, through first sensor data. For example, the monitoring can provide first sensor indicative of what is happening in the environment around the autonomous vehicle, such as for determining trajectories of the autonomous vehicle. Sensors can include one or more of the sensors illustrated in FIG. 2. The first sensor 522 may be one or more of the sensors illustrated in FIG. 2.

The first sensor, such as first sensor 522 can be one or more of: a radar sensor, a non-radar sensor, a camera sensor, a microphone, an infrared sensor, an image sensor, and a LIDAR sensor. In one or more embodiments or examples, the first sensor 522 can be selected from the group consisting of a radar sensor, a camera sensor, and a LIDAR sensor.

The system 500 can be configured to determine a first position parameter 504 of the first sensor 522. For example, the system 500 can be configured to determine the first position parameter 504 based on the first location data 502. The system 500 can be configured to determine the first position parameter 504 not based on the first location data 502. The system 500 can be configured to obtain a first position parameter 504. For example, the system 500 can be configured to obtain the first position parameter 504 from the harness code.

The first position parameter 504 can be indicative of a vertical orientation of the first sensor 522. For example, a vertical orientation may be seen an orientation of the first sensor 522 with respect to a vertical plane or a vertical axis that points towards the ground or not. For example, the first sensor 522 may be positioned to have a vertical orientation towards the ground, which corresponds to an inverted position of the first sensor 522. For example, the first sensor 522 may be positioned to have a vertical orientation not towards the ground, which corresponds to an upright position and/or a non-inverted position of the first sensor 522. The first position parameter 504 can be indicative of the first sensor 522 in a non-inverted position, such as in a non-inverted position with respect to the road surface. A non-inverted position may also be known as a regular and/or normal position. The non-inverted position may be indicative of an upright position, e.g. with respect to the road surface.

The first position parameter 504 can be indicative of the first sensor 522 in an inverted position, e.g. with respect to the road surface. The inverted position may be an upside down position, e.g. with respect to the road surface. For example, a first sensor 522 having a position parameter indicating an inverted mounting allows for the bracket to be above the first sensor 522, which eliminates the occlusion from the bracket The first position parameter 504 can be indicative of a vertical orientation of the first sensor 522 with respect to a ground level, e.g. a road surface. The ground level may be a surface that the autonomous vehicle is located on. For example, the ground level may be a road surface.

The system 500 can be configured to determine a first configuration parameter 506. For example, the system 500 can be configured to determine the first configuration parameter 506 based on the first position parameter 504. For example, the first position parameter 504 may be indicative of a vertical position of the first sensor 522.

The first configuration parameter 506 can include one or more different parameters which may be relevant to the first sensor 522. The first configuration parameter 506 can be indicative of an operation of the first sensor 522. The first configuration parameter 506 can be indicative of a rotation of the first sensor 522. The first configuration parameter 506 can be indicative of a field-of-view of the first sensor 522.

The system 500 can be configured to determine the first configuration parameter 506 automatically. The system 500 can be configured to determine the first configuration parameter 506 without user input. The system 500 can be configured to determine the first configuration parameter 506 when the first sensor 522 is attached to the autonomous vehicle.

Advantageously, the same hardware sensor, such as the first sensor (such as first sensor 522), can be used for any position on the autonomous vehicle. For example, the first sensor 522 can be placed at any location on the autonomous vehicle, and the system 500 can be configured to determine the first configuration parameter 506. In other words, the system 500 can auto-configure the first sensor 522, e.g. without human intervention, and without a trial-and-error setup process. Human error and/or adjustment for setup of the first sensor 522 can thus be reduced and/or eliminated.

Advantageously, this can improve synchronization of the first sensor 522. For example, synchronization of the first sensor 522 with any other sensors of the autonomous vehicle can be improved.

In one or more embodiments or examples, the first configuration parameter 506 can include a synchronization parameter of the first sensor 522. A synchronization parameter may be indicative of a synchronization of the first sensor 522, such as with a phase and/or time offset. The synchronization parameter may be indicative of a synchronization of the first sensor 522 with another sensor, such as a second sensor 524. In one or more embodiments or examples, the first synchronization parameter can include one or more of: a rotation direction parameter of the first sensor 522, a phase parameter of the first sensor 522, a location parameter of the first sensor 522, and a time offset parameter of the first sensor 522.

In one or more embodiments or examples, the first configuration parameter 506 can include one or more of: a rotation direction parameter of the first sensor 522, a phase parameter of the first sensor 522, a location parameter of the first sensor 522, a time offset parameter of the first sensor 522, a synchronization parameter of the first sensor 522, a field-of-view parameter of the first sensor 522, and a field-of-view occlusion parameter of the first sensor 522.

The rotation direction parameter may be indicative of a rotation direction of the first sensor 522. The rotation direction parameter may be indicative of a rotation direction such as clockwise or counterclockwise. Other types of rotation can be used as well.

The phase parameter may be indicative of a phase of the rotation of the first sensor 522, such as a phase lock of the rotation of the first sensor 522. The time offset parameter may be indicative of a time offset of the rotation of the first sensor 522 with respect to another sensor, e.g. to achieve synchronization, such as firing time offset.

A field-of-view parameter may be indicative of a field-of-view of the first sensor, e.g. of first sensor 522. For example, the field-of-view parameter may be indicative of a position of a high-resolution zone of the first sensor, e.g. of first sensor 522. A field-of-view occlusion parameter may be indicative of an occlusion of a field-of-view of the first sensor, e.g. of first sensor 522. The field-of-view occlusion parameter may be indicative of an occlusion, meaning that the first sensor 522 (e.g. rear sensor) does not detect in a certain occluded area (e.g. front area). The field-of-view occlusion parameter may be indicative of no occlusion, meaning that the first sensor 522 detects in a proper area.

A location parameter may be indicative of a location of the first sensor, e.g. of first sensor 522. For example, the location parameter can be indicative of a rear location, can be indicative of a side location, and/or can be indicative of a front location of the first sensor, e.g. of first sensor 522. Other locations can be used as well, and the listed locations are merely illustrative.

The location parameter can be indicative of a tilt of the first sensor, e.g. of first sensor 522. The location parameter can be indicative of a tilt of the first sensor 522 from parallel. The location parameter can be indicative of a tilt of the first sensor 522 from a centerline. For example, the first location parameter can be indicative of a 20-27 degree downward tilt. This may be advantageous for a front sensor. The first location parameter can be indicative of a 30-37 degree downward tilt. This may be advantageous for a side sensor. The first location parameter can be indicative of a 15-19 degree upward tilt. This may be advantageous for a rear sensor. However, other tilts and positions may be used as well.

In one or more embodiments or examples, the first configuration parameter 506 can be indicative of the first sensor 522 being located on one or more of: a side of the autonomous vehicle, a front of the autonomous vehicle, and a back of the autonomous vehicle.

The system 500 can be configured to operate the first sensor 522 based on the first configuration parameter 506. For example, the system 500 can be configured to operate the first sensor 522 with a control system 520, which may include any or all components of control system 408. The system 500 can include the control system 520. The autonomous system 540 can include the control system 520.

In one or more embodiments or examples, the system 500 can be configured to operate the first sensor 522 by configuring, based on the first configuration parameter 506, an operation of the first sensor 522. In one or more embodiments or examples, the system 500 can be configured to operate the first sensor 522 by rotating, based on the first configuration parameter 506, the first sensor 522.

The system 500 can be configured to operate the first sensor by adjusting a tilt of the first sensor 522 based on the first configuration parameter 506. The system 500 can be configured to operate the first sensor 522 by configuring (e.g. adjusting, adapting, setting up) a rotation direction of the first sensor 522 based on the first configuration parameter 506. The system 500 can be configured to operate the first sensor 522 by configuring (e.g. adjusting, adapting, setting up) a rotation speed of the first sensor 522 based on the first configuration parameter 506. The system 500 can be configured to operate the first sensor 522 by configuring (e.g. adjusting, adapting, setting up) a location of a high resolution zone of the first sensor 522 based on the first configuration parameter 506.

The system 500 can be configured to automatically operate the first sensor 522 based on the first configuration parameter 506. For example, a first sensor 522 can be installed somewhere on an autonomous vehicle, and the system 500 can be configured to operate the first sensor 522 by configuring (e.g. adjust, adapt, set up) the first sensor 522 to its position based on the first configuration parameter 506.

The system 500 can be configured to operate the first sensor 522 by synchronizing, based on the first configuration parameter 506, an operation of the first sensor 522 with an operation of a second sensor 524, such as a rotation of the first sensor 522 with a rotation of the second sensor 524. Synchronizing can be, for example, coordinating, correlating, cross-operating, adjusting, harmonizing, meshing, and/or integrating.

The system 500 can be configured to operate the first sensor 522 by synchronizing, based on the first configuration parameter 506, an operation of the first sensor 522 with an operation of one or more of a second sensor 524, a third sensor, and a fourth sensor. The particular number of sensors is not limiting.

In one or more embodiments or examples, the at least one memory storing instructions thereon can cause the at least one processor to obtain second location data 512 of a second sensor 524 associated with an autonomous vehicle. In one or more embodiments or examples, the at least one memory storing instructions thereon can cause the at least one processor to determine, based on the second location data 512, a second position parameter 514 indicative of a vertical orientation of the second sensor 524 with respect to the ground level. In one or more embodiments or examples, the at least one memory storing instructions thereon can cause the at least one processor to determine, based on the second position parameter 514, a second configuration parameter 516 indicative of a configuration of the second sensor 524. In one or more embodiments or examples, the at least one memory storing instructions thereon can cause the at least one processor to operate, based on the second configuration parameter 516, the second sensor 524.

Advantageously, the second sensor (e.g. second sensor 524) can be the same type of sensor as the first sensor (e.g. first sensor 522). The second sensor (e.g. second sensor 524) can have the same specifications as the first sensor (e.g. first sensor 522). For example, the first sensor and the second sensor (e.g. second sensor 524) can be interchangeable sensors. Advantageously, this allows the same type of sensor to be used in all positions on the autonomous vehicle. This may reduce and/or eliminate human error, such as which may occur with a user putting the wrong sensor in a wrong position. The use of the same type of sensor may also allow for cost savings for replacement components, such as allowing for easy procurement of the sensor and maintenance. Further cost savings can include less software and/or code that would need to be written.

In one or more embodiments or examples, the system 500 can be configured to synchronize operation of the first sensor 522 with operation of the second sensor 524. The system 500 can be configured to synchronize a firing pattern of the first sensor 522 with a firing pattern of the second sensor 524.

The second location data 512 can be indicative of a position, such as placement and/or location, of the second sensor 524 with respect to the autonomous vehicle. For example, the second location data 512 can be indicative of the component of the autonomous vehicle that the second sensor 524 is located on. The second location data 512 can be a harness code. The second location data 512 can be indicative of a harness code. The second location data 512 can be obtained from a harness code. For example, the second sensor 524 can be attached to the autonomous vehicle at a harness having a harness code.

The system 500 can be configured to obtain the second location data 512 from the autonomous system 540. The system 500 can be configured to obtain the second location data 512 from a harness. The system 500 can be configured to obtain a location harness code for the second sensor 524. The system 500 can determine, such as obtain, the second location data 512 from the harness code. The harness code may be read by the second sensor 524 and provided to the autonomous system by the second sensor 524.

The second sensor, such as second sensor 524 can be one or more sensors, such as a second onboard sensor. The second sensor 524 may be associated with the autonomous vehicle. An autonomous vehicle may include one or more sensors that can be configured to monitor an environment where the autonomous vehicle operates, such as via the second sensor 524, through second sensor data. For example, the monitoring can provide second sensor data indicative of what is happening in the environment around the autonomous vehicle, such as for determining trajectories of the autonomous vehicle. Sensors can include one or more of the sensors illustrated in FIG. 2. The second sensor 524 may be one or more of the sensors illustrated in FIG. 2.

The second sensor, such as second sensor 524 can be one or more of: a radar sensor, a non-radar sensor, a camera sensor, a microphone, an infrared sensor, an image sensor, and a LIDAR sensor. In one or more example systems, the second sensor 524 can be selected from the group consisting of a radar sensor, a camera sensor, and a LIDAR sensor.

The system 500 can be configured to determine a second position parameter 514 of the second sensor 524. For example, the system 500 can be configured to determine the second position parameter 514 based on the second location data 512. The system 500 can be configured to determine the second position parameter 514 not based on the second location data 512. The system 500 can be configured to obtain a second position parameter 514. For example, the system 500 can be configured to obtain the second position parameter 514 from the harness code.

The second position parameter 514 can be indicative of a vertical orientation of the second sensor 524. For example, a vertical orientation may be seen an orientation of the second sensor 524 with respect to a vertical plane or a vertical axis that points towards the ground or not. For example, the second sensor 524 may be positioned to have a vertical orientation towards the ground, which corresponds to an inverted position of the second sensor 524. For example, the second sensor 524 may be positioned to have a vertical orientation not towards the ground, which corresponds to an upright position and/or a non-inverted position of the first sensor. The second position parameter 514 can be indicative of the second sensor 524 in a non-inverted position, such as in a non-inverted position with respect to the road surface. A non-inverted position may also be known as a regular and/or normal position. The non-inverted position may be indicative of an upright position, e.g. with respect to the road surface.

The second position parameter 514 can be indicative of the second sensor 524 in an inverted position, e.g. with respect to the road surface. The inverted position may be an upside down position, e.g. with respect to the road surface. For example, a second sensor 524 having a position parameter indicating an inverted mounting allows for the bracket to be above the first sensor, which eliminates the occlusion from the bracket The second position parameter 514 can be indicative of a vertical orientation of the second sensor 524 with respect to a ground level, e.g. a road surface. The ground level may be a surface that the autonomous vehicle is located on. For example, the ground level may be a road surface.

The system 500 can be configured to determine a second configuration parameter 516. For example, the system 500 can be configured to determine the second configuration parameter 516 based on the second position parameter 514. For example, the second position parameter 514 may be indicative of a vertical position of the second sensor 524.

The second configuration parameter 516 can include one or more different parameters which may be relevant to the second sensor 524. The second configuration parameter 516 can be indicative of an operation of the second sensor 524. The second configuration parameter 516 can be indicative of a rotation of the second sensor 524. The second configuration parameter 516 can be indicative of a field-of-view of the second sensor 524.

The system 500 can be configured to determine the second configuration parameter 516 automatically. The system 500 can be configured to determine the second configuration parameter 516 without user input. The system 500 can be configured to determine the second configuration parameter 516 when the second sensor 524 is attached to the autonomous vehicle.

In one or more embodiments or examples, the second configuration parameter 516 can include a synchronization parameter of the second sensor 524. The synchronization parameter may include one or more of: a rotation direction parameter of the second sensor 524, a phase parameter of the second sensor 524, a location parameter of the second sensor 524, and a time offset parameter of the second sensor 524.

In one or more embodiments or examples, the second configuration parameter 516 can include one or more of: a rotation direction parameter of the second sensor 524, a phase parameter of the second sensor 524, a location parameter of the second sensor 524, a time offset parameter of the second sensor 524, a field-of-view parameter of the second sensor 524, a synchronization parameter of the second sensor 524, and a field-of-view occlusion parameter of the second sensor 524. For example, the parameters discussed with respect to second configuration parameters 516 can be the same as those discussed with respect to the first configuration parameter 506.

In one or more embodiments or examples, the system 500 can be configured to operate the second sensor 524 by rotating, based on the second configuration parameter 516, the second sensor 524. For example, the system 500 can be configured to operate the second sensor 524 with the control system 520, which may include any or all components of control system 408. In one or more embodiments or examples, the system 500 can be configured to operate the second sensor 524 by operating, based on the first configuration parameter 506 and second configuration parameter 516, the second sensor 524.

In one or more embodiments or examples, the system 500 can be configured to operate the first sensor 522 by operating, based on the first configuration parameter 506 and second configuration parameter 516, the first sensor 522. For example, the system 500 can be configured to operate the second sensor 524 based on the first sensor 522, and vice versa. The system 500 can be configured to operate the first sensor 522 based on the second sensor 524. The system 500 can be configured to operate the first sensor 522 and the second sensor 524 so that the first sensor 522 and the second sensor 524 are properly synchronized for obtaining sensor data. In one or more embodiments or examples, the system 500 can be configured to operate the second sensor 524 by configuring, based on the second configuration parameter 516, an operation of the second sensor 524.

The system 500 can be configured to operate the second sensor 524 by adjusting a tilt of the second sensor 524 based on the second configuration parameter 516. The system 500 can be configured to operate the second sensor 524 by configuring (e.g. adjusting, adapting, setting up) a rotation direction of the second sensor 524 based on the second configuration parameter 516. The system 500 can be configured to operate the second sensor 524 by configuring (e.g. adjusting, adapting, setting up) a rotation speed of the second sensor 524 based on the second configuration parameter 516. The system 500 can be configured to operate the second sensor 524 by configuring (e.g. adjusting, adapting, setting up) a location of a high resolution zone of the second sensor 524 based on the second configuration parameter 516.

The system 500 can be configured to automatically operate the second sensor 524 based on the second configuration parameter 516. For example, a second sensor 524 can be installed somewhere on an autonomous vehicle, and the system 500 can be configured to operate the second sensor 524 to configure (e.g. adjust, adapt, set up) the second sensor 524 to its position based on the second configuration parameter 516.

In one or more embodiments or examples, to operate the second sensor 524 can include to synchronize, based on the first configuration parameter 506 and the second configuration parameter 516, rotation of the second sensor 524 with rotation of the first sensor 522.

For example, the system 500 can control rotation of the second sensor 524 so that rotation of the first sensor 522 and the second sensor 524 move in the same direction. The system 500 can control rotation of the second sensor 524 so that the first sensor 522 and the second sensor 524 have proper firing time offset for sensor data obtained by the system 500. The system 500 can control a phase of the second sensor 524 so that it is in phase with the first sensor 522.

In one or more embodiments or examples, the first sensor, e.g. first sensor 522 can be a first LIDAR sensor and the second sensor 524 can be a second LIDAR sensor. For example, the first sensor, e.g. first sensor 522 can be a short-range LIDAR sensor. The second sensor 524 can be a short-range LIDAR sensor.

While a first sensor 522 and second sensor 524 are discussed herein, the autonomous vehicle can have further sensors, such as a third sensor, a fourth sensor, etc. The system 500 can be configured to determine respective third and/or fourth location data, third and/or fourth position parameters, and third and/or fourth configuration parameters. The system 500 can be configured to operate the third and/or fourth sensors.

The third sensor may be a LIDAR sensor, such as a short-range LIDAR sensor. The fourth sensor may be a LIDAR sensor, such as a short-range LIDAR sensor. The number of sensors on the autonomous vehicle is not limiting. The system 500 can be configured to operate the third sensor and/or the fourth manner as discussed herein with respect to the first sensor 522 and/or the second sensor 524.

In one or more embodiments or examples, a four sensor LIDAR layout can allow the same component, e.g., the same sensor type, with a high resolution band to be used in all locations on the vehicle and achieve the sensor field of view requirements, as well as satisfy vehicle mounting needs. For example, a front sensor can be mounted upright at 27 degree tilt downwards and can have clockwise spin. Two side sensors can be mounted, one on each side of the vehicle, upright at 37 degree tilt downwards and can have clockwise spin. A rear sensor can be mounted inverted at 19 degree tilt upwards and can have counterclockwise spin. However, the particular tilts and positions are merely explanatory.

In one or more embodiments or examples, the at least one memory storing instructions thereon can cause the at least one processor to obtain first sensor data from the first sensor 522, the first sensor data associated with an environment in which the autonomous vehicle is operating. In one or more embodiments or examples, the at least one memory storing instructions thereon can cause the at least one processor to obtain second sensor data from the second sensor 524, the second sensor data associated with the environment. In one or more embodiments or examples, the at least one memory storing instructions thereon can cause the at least one processor to generate, based on the first sensor data and the second sensor data, a combined sensor view data indicative of the environment.

The first sensor data can be one or more of: radar sensor data, non-radar sensor data, camera sensor data, image sensor data, audio sensor, and LIDAR sensor data. The particular type of sensor data is not limiting. The first sensor data can be indicative of an environment around an autonomous vehicle. For example, the first sensor data can be indicative of an object, and/or a plurality of objects, in the environment around an autonomous vehicle.

The second sensor data can be one or more of: radar sensor data, non-radar sensor data, camera sensor data, image sensor data, audio sensor, and LIDAR sensor data. The particular type of sensor data is not limiting. The second sensor data can be indicative of an environment around an autonomous vehicle. For example, the second sensor data can be indicative of an object, and/or a plurality of objects, in the environment around an autonomous vehicle.

The combined sensor view data can be indicative of a portion of the environment. The combined sensor view data can be indicative of a combined field-of-view of the first sensor 522 and the second sensor 524. The system 500 can be configured to combine the field-of-view of the first sensor 522 with the field-of-view of the second sensor 524 for determination of the combined sensor view data. The system 500 can be configured to combine the field-of-view indicated by the first sensor data with the field-of-view indicated by the second sensor data for determination of the combined sensor view data. The combined sensor view data may be indicative of a 360 degree view around the autonomous vehicle. The combined sensor view data may be indicative of an entire range of the first sensor 522 and the second sensor 524.

In one or more embodiments or examples, the combined sensor view data can be indicative of vertical coverage from the ground level to a pre-determined height from the ground level. For example, the combined sensor view may be indicative of the environment up to the pre-determined height. Above the pre-determined height, the system 500 may be configured to obtain top sensor data from a top sensor. The top sensor may be a LIDAR sensor. The top sensor may be a long-range LIDAR sensor.

The pre-determined height may be 1.5 m above the ground level. For example, the system 500 may be configured to obtain sensor data up to 1.5 m from the ground. The pre-determined height may be 1.0 m above the ground level. For example, the system 500 may be configured to obtain sensor data up to 1.0 m from the ground. The pre-determined height may be 0.5 m above the ground level. For example, the system 500 may be configured to obtain sensor data up to 0.5 m from the ground. The pre-determined height may be 0.0 m above the ground level. For example, the system 500 may be configured to obtain sensor data up to 0.0 m from the ground.

For example, the system 500 can be configured to generate combined sensor view data indicative of an environment around the autonomous vehicle from ground level to the pre-determined height. The combined sensor view data may be indicative of the environment from around a body of the autonomous vehicle. The combined sensor view data may be indicative of the environment of 0.5 mm from the body of the autonomous vehicle. The combined sensor view data may be indicative of the environment of 1.0 mm from the body of the autonomous vehicle.

In one or more embodiments or examples, in response to determining that the first position parameter 504 can be indicative of a non-inverted position, the at least one memory storing instructions thereon can cause the at least one processor to determine the first configuration parameter 506 as indicative of a rotation direction parameter for a clockwise direction. For example, the non-inverted position may be upright mounting, such as normal mounting.

In one or more embodiments or examples, in response to determining that the first position parameter 504 can be indicative of an inverted position, the at least one memory storing instructions thereon can cause the at least one processor to determine the first configuration parameter 506 as indicative of a rotation direction parameter for a counterclockwise spin.

It may be advantageous for the first sensor (e.g. first sensor 522) to be in an inverted position. For example, the first sensor (e.g. first sensor 522) may be mounted as a rear inverted mounting, such as under a bumper of an autonomous car. The system 500 can be configured to obtain first sensor data from the first sensor (e.g. first sensor 522) which is not occluded, or minimally occluded, from the bumper. The first sensor (e.g. first sensor 522) may be mounted on a bracket, and the system 500 can be configured to obtain first sensor data from the first sensor (e.g. first sensor 522) which is not occluded by the bracket. For example, the bracket may be "above" the first sensor, e.g., further from ground level, which can reduce and/or eliminate occlusion.

Having the first sensor in the inverted position can allow for a simpler bracket design. For example, the first sensor can be more integrated into the look of the bumper for better aesthetics. Further, the first sensor data from the first sensor may have no occlusion from the bracket.

The system 500 can be configured to obtain first sensor data having field-of-view coverage underneath the autonomous vehicle, such as from a rear of the autonomous vehicle towards a front of the autonomous vehicle.

Figures 6A, 6B:
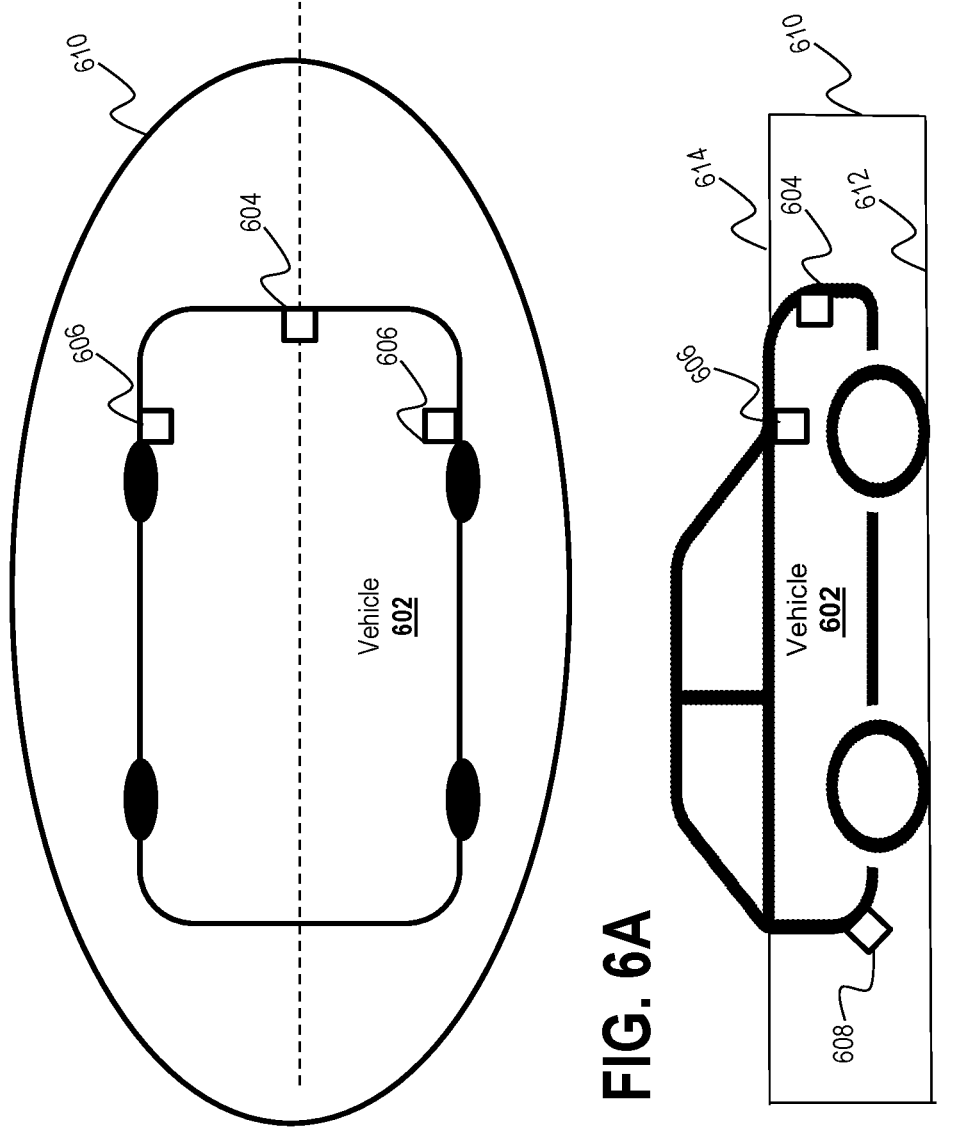
FIGS. 6A-6D are diagrams of an example implementation of a process for sensor operation.

Referring now to FIGS. 6A-6D, illustrated are diagrams of an implementation 600 of a process for methods and systems for sensor operation. In particular, FIG. 6A illustrates a diagram of a top-down view of an autonomous vehicle 602. As shown, the autonomous vehicle 602 may include a front sensor 604 and a pair of side sensors 606. The front sensor 604 and the pair of side sensors 606 can be in a non-inverted position. The autonomous vehicle 602 can further include a rear sensor 608 that is underneath the autonomous vehicle 602 and is therefore blocked in the view of FIG. 6A. The sensors 604, 606, and 608 can produce a combined sensor view data 610 of sensor data surrounding the autonomous vehicle 602. The first sensor and/or the second sensor may be any one of front sensor 604, side sensors 606, and rear reasons 608.

FIG. 6B illustrates a diagram of a side-view of an autonomous vehicle 602. Rear sensor 608 can now be seen in an inverted position. As the sensors 604, 606, and 608 are all located in different locations and vertical positions, the system 500 may be configured to obtain location data and determine position parameters and configuration parameters for each of the sensors. The system 500 can be configured to automatically to obtain location data and determine position parameters and configuration parameters for each of the sensors. For example, a user may not need to enter any information about the sensor. The system 500 can be configured to automatically operate each of the sensors 604, 606, and 608, such as through tilting and/or rotation, for a 360 view of the autonomous vehicle 602, such as indicated by the combined sensor view data 610.

As shown in FIG. 6B, the combined sensor view data 610 may include both a lateral area and a vertical area. The combined sensor view data 610 may have a lateral area which extends to a limit of the range of the sensors 604, 606, and 608. The combined sensor view data 610 can be indicative of vertical coverage from a ground level 612 to a pre-determined height 614 from the ground level 612. For example, the combined sensor view data 610 can be indicative of the environment around the autonomous vehicle 602 up to 0.0 m, 0.5 m, 1.0 m, and 1.5 m from ground level 612. The combined sensor view data 610 can be indicative of the environment around the autonomous vehicle 602 between 0 m and 1.5 m from ground level 612. Accordingly, the combined sensor view data 610 can be indicative of the environment around the autonomous vehicle 602 from the ground level 612 up to the pre-determined height 614. The combined sensor view data 610 can be indicative of the environment around the autonomous vehicle 602 from the ground level 612 up to greater than 1.5 m from ground level 612, and can be determined by the trigonometry of the sensor range and the elevation angle, e.g. vertical, of the sensor(s) 604, 606, 608.

Figure 6C:
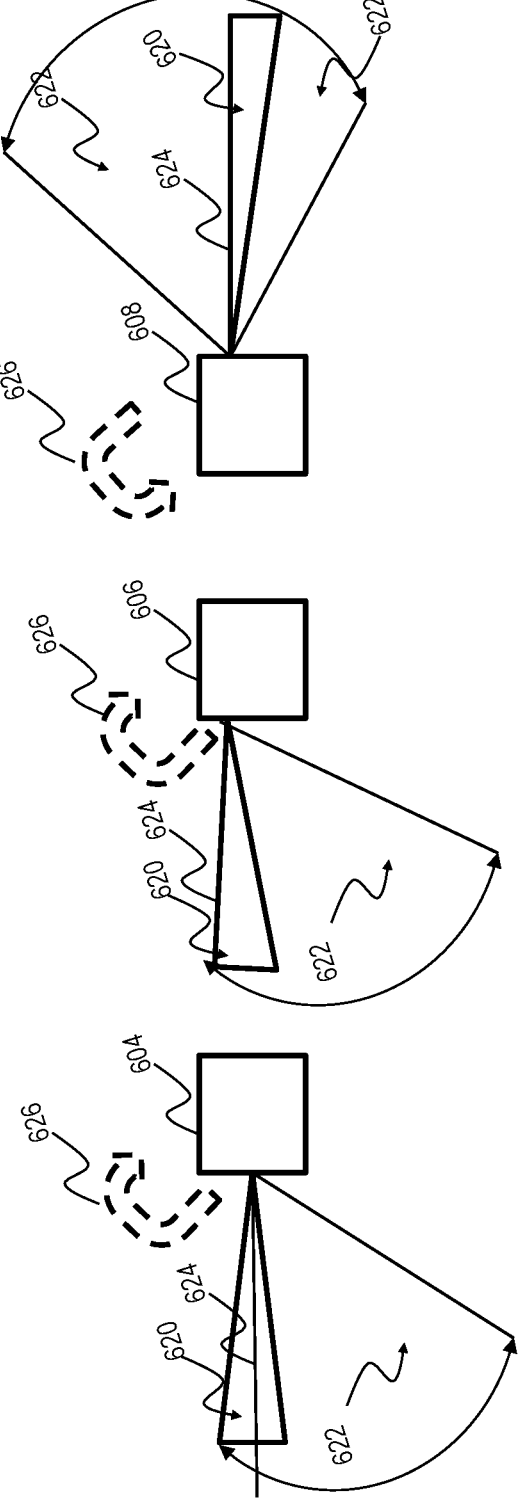

FIG. 6C illustrates a diagram of sensors 604, 606, and 608 of the autonomous vehicle 602, in particular the vertical field-of-view coverage. As shown, each sensor can have a high-resolution zone 620 and a low-resolution zone 622. It can be advantageous to configure and/or adjust a tilt of the sensors 604, 606, and 608 for an optimal orientation of the high-resolution zone 620. In addition, it can be advantageous to configure and/or adjust a tilt of the sensors 604, 606, and 608 for a vertical field of view being greater towards the ground, which can incentivize flipping the sensor, such as sensor 608, when it is placed closer towards the ground. The orientation can be based on a horizon 624, which can be a view from the sensor 604, 606, and 608 parallel to the ground sensor. The system 500 can be configured to automatically operate the sensors 604, 606, and 608 in order to achieve the optimum tilt orientation for the high-resolution zone 620.

FIG. 6C further illustrates rotation 626 of the sensors 604, 606, and 608. As shown, the front sensor 604 and the side sensor 606 can have a rotation 626 of clockwise. Rear sensor 608 has a rotation 626 of counterclockwise. The system 500 can be configured to automatically operate the sensors 604, 606, and 608 in order to achieve synchronized rotation.

Figure 6D:
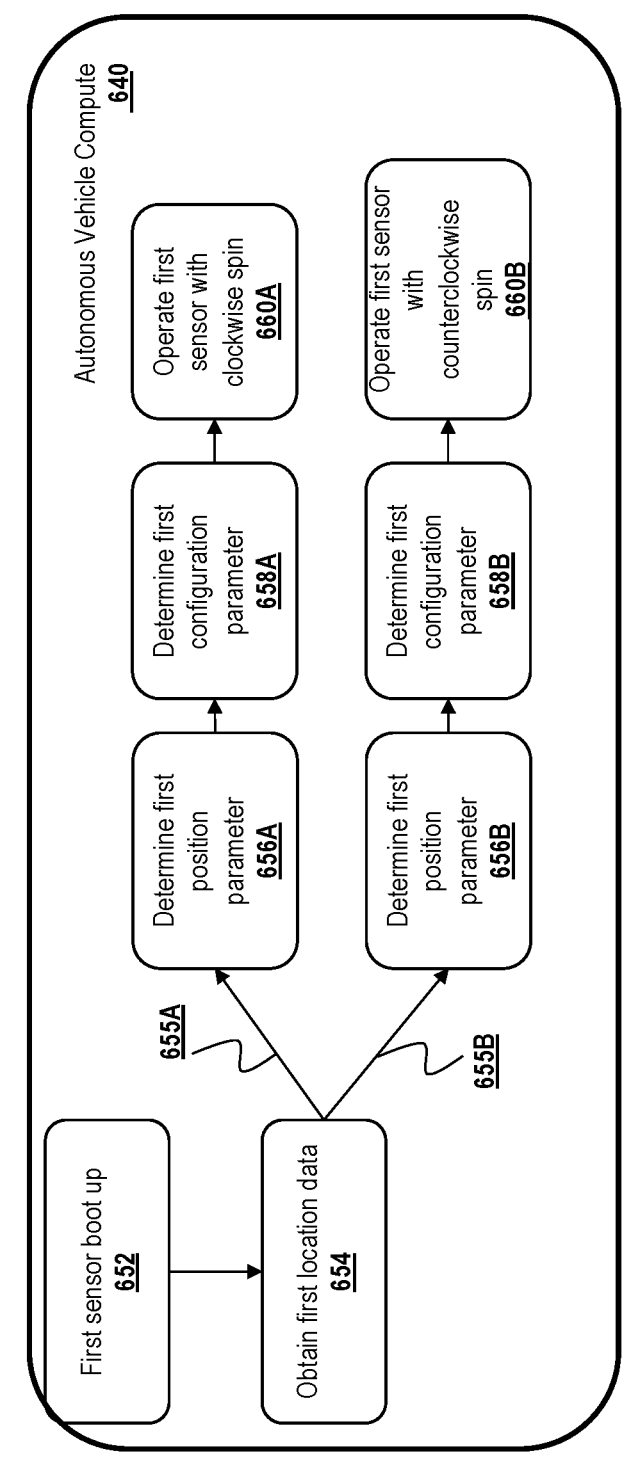

FIG. 6D illustrates an implementation and/or system 600 of the disclosure, such as using an autonomous system 640, such as including any and all components of autonomous system 540, such as including an AV compute.

As shown, the first sensor can be turned on, such as booted up 652. The implementation 600 can obtain first location data 654 of the now booted up first sensor. Advantageously, the implementation 600 can automatically determine the first location data indicative 654 of the location of the first sensor, such as based on a harness code that can be read during bootup. For example, the implementation 600 can determine the first location data 654 indicative of a front or side location 655A or indicative of a rear location 655B.

In accordance with a determination that the first location data 654 is indicative of a front or side location 655A, the implementation 600 can determine 656A a first position parameter. The first position parameter can be indicative of a non-inverted position. The implementation 600 can determine 658A a first configuration parameter, which can be indicative of a clockwise spin. The implementation 600 can operate 660A the first sensor with the clockwise spin indicated in the first configuration parameter.

In accordance with a determination that the first location data 654 is indicative of a rear location 655B, the implementation 600 can determine 656B a first position parameter. The first position parameter can be indicative of an inverted position. The implementation 600 can determine 658B a first configuration parameter, which can be indicative of a counterclockwise spin. The implementation 600 can operate 660B the first sensor with the counterclockwise spin indicated in the first configuration parameter.

Advantageously, the implementation 600 can automatically determine the first sensor's location based on a harness code that is read upon bootup. After bootup, the system can determine the location the first sensor is in and automatically configures for clockwise or counterclockwise operation mode. The implementation 600 can repeat the process for any other sensors, such as a second sensor, third sensor, and/or fourth sensor which may be associated with an autonomous vehicle.

A rear sensor may operate in a counterclockwise direction because it is mounted inverted. This can allow all sensors to have a synchronized firing pattern and ensure the data flows smoothly for sequential processing.

Referring now to FIG. 7, illustrated is a flowchart of a method or process 700 for sensor operation, such as for operating and/or controlling an AV and/or components thereof. The method can be performed by a system disclosed herein, such as an AV compute 400, autonomous system 202, 540, and 640, and a vehicle 102, 200, of FIGS. 1, 2, 3, 4, and implementations of FIGS. 6A-6D. The system disclosed, such as system 500, can include at least one processor which can be configured to carry out one or more of the operations of method 700.

Disclosed herein is a method 700. In one or more embodiments or examples, the method 700 can include obtaining at step 702, using at least one processor, first location of a first sensor associated with an autonomous vehicle. In one or more embodiments or examples, the method 700 can include determining at step 704, using the at least one processor, based on the first location data, a first position parameter indicative of a vertical orientation of the first sensor with respect to a ground level. In one or more embodiments or examples, the method 700 can include determining at step 706, using the at least one processor, based on the first position parameter, a first configuration parameter indicative of a configuration of the first sensor. In one or more embodiments or examples, the method 700 can include operating at step 708, using the at least one processor, based on the first configuration parameter, the first sensor.

The first location data can be a harness code. The first position parameter can be indicative of an inverted position. The first position parameter can be indicative of a non-inverted position. The first position parameter can be indicative of vertical orientation with respect to a road surface.

The first configuration parameter can be seen as a configuration of an operation of the first sensor, such as a rotation of the sensor and/or field-of-view of the first sensor. The first configuration parameter can be determined automatically. Advantageously, a same hardware sensor can be used for any position, which can allow for less human error. The first configuration parameter can be indicative of a synchronization, such as with respect to a second sensor, or other sensors.

Operating, at step 708, the first sensor can include synchronizing, such as coordinating, correlating, cross-operating, based on the first configuration parameter, an operation of the first sensor with an operation of a second sensor, such as a rotation of the first sensor with a rotation of the second sensor.

In one or more embodiments or examples, the first configuration parameter comprises one or more of: a rotation direction parameter of the first sensor, a phase parameter of the first sensor, a location parameter of the first sensor, a time offset parameter of the first sensor, a synchronization parameter of the first sensor, a field-of-view parameter of the first sensor, and a field-of-view occlusion parameter of the first sensor.

The rotation direction parameter may be indicative of a rotation direction such as clockwise or counterclockwise. The phase parameter may be indicative of a phase of the rotation, such as a phase lock of the rotation. The time offset parameter may be indicative of a time offset of the rotation of the first sensor with respect to another sensor, e.g. to achieve synchronization, such as firing time offset. The synchronization parameter may be indicative of a synchronization with other sensors on the autonomous vehicle. A field-of-view parameter may be indicative of a field-of-view of the first sensor. A field-of-view occlusion parameter may be indicative of an occlusion of a field-of-view of the first sensor so that the first sensor (e.g. rear sensor) does not detect in a certain occluded area (e.g. front area). A first location parameter indicative of a rear location, a side location, and/or a front location. The first location parameter can be indicative of the tilt.

In one or more embodiments or examples, operating at step 708 the first sensor can include rotating, based on the first configuration parameter, the first sensor.

In one or more embodiments or examples, the method 700 can include obtaining, using the at least one processor, second location data of a second sensor associated with an autonomous vehicle. In one or more embodiments or examples, the method 700 can include determining, using the at least one processor, based on the second location data, a second position parameter indicative of a vertical orientation of the second sensor with respect to the ground level. In one or more embodiments or examples, the method 700 can include determining, using the at least one processor, based on the second position parameter, a second configuration parameter indicative of a configuration of the second sensor. In one or more embodiments or examples, the method 700 can include operating, using the at least one processor, based on the second configuration parameter, the second sensor.

The first sensor and the second sensor can have the same specifications. The first sensor and the second sensor may be interchangeable. Operating the second sensor can allow for a synchronized firing pattern.

In one or more embodiments or examples, the second configuration parameter can include one or more of: a rotation direction parameter of the second sensor, a phase parameter of the second sensor, a location parameter of the second sensor, a time offset parameter of the second sensor, a field-of-view parameter of the second sensor, a synchronization parameter of the second sensor, and a field-of-view occlusion parameter of the second sensor.

In one or more embodiments or examples, operating the second sensor can include rotating, using the at least one processor, based on the second configuration parameter, the second sensor.

In one or more embodiments or examples, the method 700 can include operating the second sensor comprises operating, using the at least one processor, based on the first configuration parameter and second configuration parameter, the second sensor Operating at step 708 the first sensor can include operating based on the first configuration parameter and the second configuration parameter.

In one or more embodiments or examples, operating the second sensor can include synchronizing, using the at least one processor, based on the first configuration parameter and the second configuration parameter, rotation of the second sensor with rotation of the first sensor.

In one or more embodiments or examples, the method 700 can include obtaining, using the at least one processor, first sensor data from the first sensor, the first sensor data associated with an environment in which the autonomous vehicle is operating. In one or more embodiments or examples, the method 700 can include obtaining, using the at least one processor, second sensor data from the second sensor, the second sensor data associated with the environment. In one or more embodiments or examples, the method 700 can include generating, using the at least one processor, based on the first sensor data and the second sensor data, a combined sensor view data indicative of the environment.

In one or more embodiments or examples, the combined sensor view data can be indicative of vertical coverage from the ground level to a pre-determined height from the ground level.

For example, the combined sensor view data can have a threshold of 0.0 m from ground coverage, 0.5 m from ground coverage, 1.0 m from ground coverage, or 1.5 m from ground coverage. The combined sensor view data can have a threshold of greater than 1.5 m from ground coverage. Above, the autonomous vehicle can be configured to switch to a top sensor.

In one or more embodiments or examples, the first sensor can be a first LIDAR sensor and the second sensor can be a second LIDAR sensor. A LIDAR sensor may be a short-range lidar sensor.

In one or more embodiments or examples, the first configuration parameter can be indicative of the first sensor being located on one or more of: a side of the autonomous vehicle, a front of the autonomous vehicle, and a back of the autonomous vehicle.

In one or more embodiments or examples, in response to determining that the first position parameter is indicative of a non-inverted position, determining the first configuration parameter as indicative of a rotation direction parameter for a clockwise direction. A non-inverted position may be considered an upright mounting, or a normal mounting.

In one or more embodiments or examples, in response to determining that the first position parameter is indicative of an inverted position, determining the first configuration parameter as indicative of a rotation direction parameter for a counterclockwise spin.

An inverted position may be considered one or more of: rear inverted mounting, under bumper mounting, no occlusion from the bracket, less occlusion from bumper, field-of-view coverage including some going under the autonomous vehicle towards the front.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

Also disclosed are methods, non-transitory computer readable media, and systems according to any of the following items:

Item 1. A method comprising:

obtaining, using at least one processor, first location data of a first sensor associated with an autonomous vehicle;

determining, using the at least one processor, based on the first location data, a first position parameter indicative of a vertical orientation of the first sensor with respect to a ground level;

determining, using the at least one processor, based on the first position parameter, a first configuration parameter indicative of a configuration of the first sensor; and operating, using the at least one processor, based on the first configuration parameter, the first sensor.

Item 2. The method of Item 1, wherein the first configuration parameter comprises one or more of: a rotation direction parameter of the first sensor, a phase parameter of the first sensor, a location parameter of the first sensor, a time offset parameter of the first sensor, a synchronization parameter of the first sensor, a field-of-view parameter of the first sensor, and a field-of-view occlusion parameter of the first sensor.

Item 3. The method of any of the preceding Items, wherein operating the first sensor comprises rotating, based on the first configuration parameter, the first sensor.

Item 4. The method of any of the preceding Items, the method comprising:

obtaining, using the at least one processor, second location data of a second sensor associated with an autonomous vehicle;

determining, using the at least one processor, based on the second location data, a second position parameter indicative of a vertical orientation of the second sensor with respect to the ground level;

determining, using the at least one processor, based on the second position parameter, a second configuration parameter indicative of a configuration of the second sensor; and operating, using the at least one processor, based on the second configuration parameter, the second sensor.

Item 5. The method of Item 4, wherein the second configuration parameter comprises one or more of: a rotation direction parameter of the second sensor, a phase parameter of the second sensor, a location parameter of the second sensor, a time offset parameter of the second sensor, a field-of-view parameter of the second sensor, a synchronization parameter of the second sensor, and a field-of-view occlusion parameter of the second sensor.

Item 6. The method of any of Items 4-5, wherein operating the second sensor comprises rotating, using the at least one processor, based on the second configuration parameter, the second sensor.

Item 7. The method of any of Items 4-6, wherein operating the second sensor comprises operating, using the at least one processor, based on the first configuration parameter and second configuration parameter, the second sensor.

Item 8. The method of any one of Items 4-7, wherein operating the second sensor comprises synchronizing, using the at least one processor, based on the first configuration parameter and the second configuration parameter, rotation of the second sensor with rotation of the first sensor.

Item 9. The method of any of Items 4-8, the method further comprising:

obtaining, using the at least one processor, first sensor data from the first sensor, the first sensor data associated with an environment in which the autonomous vehicle is operating;

obtaining, using the at least one processor, second sensor data from the second sensor, the second sensor data associated with the environment; and generating, using the at least one processor, based on the first sensor data and the second sensor data, a combined sensor view data indicative of the environment.

Item 10. The method of Item 9, wherein the combined sensor view data is indicative of vertical coverage from the ground level to a pre-determined height from the ground level.

Item 11. The method of any one of Items 4-10, wherein the first sensor is a first LIDAR sensor and the second sensor is a second LIDAR sensor.

Item 12. The method of any one of the preceding Items, wherein the first configuration parameter is indicative of the first sensor being located on one or more of: a side of the autonomous vehicle, a front of the autonomous vehicle, and a back of the autonomous vehicle.

Item 13. The method of any one of the preceding Items, wherein in response to determining that the first position parameter is indicative of a non-inverted position, determining the first configuration parameter as indicative of a rotation direction parameter for a clockwise direction.

Item 14. The method of any of the preceding Items, wherein in response to determining that the first position parameter is indicative of an inverted position, determining the first configuration parameter as indicative of a rotation direction parameter for a counter-clockwise spin.

Item 15. A non-transitory computer readable medium comprising instructions stored thereon that, when executed by at least one processor, cause the at least one processor to carry out operations comprising:

obtaining, using at least one processor, first location data of a first sensor associated with an autonomous vehicle;

determining, using the at least one processor, based on the first location data, a first position parameter indicative of a vertical orientation of the first sensor with respect to a ground level;

determining, using the at least one processor, based on the first position parameter, a first configuration parameter indicative of a configuration of the first sensor; and operating, using the at least one processor, based on the first configuration parameter, the first sensor.

Item 16. The non-transitory computer readable medium of Item 15, wherein the first configuration parameter comprises one or more of: a rotation direction parameter of the first sensor, a phase parameter of the first sensor, a location parameter of the first sensor, a time offset parameter of the first sensor, a synchronization parameter of the first sensor, a field-of-view parameter of the first sensor, and a field-of-view occlusion parameter of the first sensor.

Item 17. The non-transitory computer readable medium of any one of Items 15-16, wherein operating the first sensor comprises rotating, using the at least one processor, based on the first configuration parameter, the first sensor.

Item 18. The non-transitory computer readable medium of any one of Items 15-18, wherein the instructions stored thereon cause the at least one processor to carry out operations comprising:

obtaining, using the at least one processor, second location data of a second sensor associated with an autonomous vehicle;

determining, using the at least one processor, based on the second location data, a second position parameter indicative of a vertical orientation of the second sensor with respect to the ground level;

determining, using the at least one processor, based on the second position parameter, a second configuration parameter indicative of a configuration of the second sensor; and operating, using the at least one processor, based on the second configuration parameter, the second sensor.

Item 19. The non-transitory computer readable medium of Item 18, wherein the second configuration parameter comprises one or more of: a rotation direction parameter of the second sensor, a phase parameter of the second sensor, a location parameter of the second sensor, a time offset parameter of the second sensor, a field-of-view parameter of the second sensor, a synchronization parameter of the second sensor, and a field-of-view occlusion parameter of the second sensor.

Item 20. The non-transitory computer readable medium of any one of Items 18-19, wherein operating the second sensor comprises rotating, using the at least one processor, based on the second configuration parameter, the second sensor.

Item 21. The non-transitory computer readable medium of any one of Items 18-20, wherein operating the second sensor comprises operating, using the at least one processor, based on the first configuration parameter and second configuration parameter, the second sensor.

Item 22. The non-transitory computer readable medium of any one of Items 18-21, wherein operating the second sensor comprises synchronizing, based on the first configuration parameter and the second configuration parameter, rotation of the second sensor with rotation of the first sensor.

Item 23. The non-transitory computer readable medium of any one of Items 18-22, wherein the instructions stored thereon cause the at least one processor to carry out operations comprising:

obtaining, using the at least one processor, first sensor data from the first sensor, the first sensor data associated with an environment in which the autonomous vehicle is operating;

obtaining, using the at least one processor, second sensor data from the second sensor, the second sensor data associated with the environment; and generating, using the at least one processor, based on the first sensor data and the second sensor data, a combined sensor view data indicative of the environment.

Item 24. The non-transitory computer readable medium of Item 23, wherein the combined sensor view data is indicative of vertical coverage from the ground level to a pre-determined height from the ground level.

Item 25. The non-transitory computer readable medium of any one of Items 18-24, wherein the first sensor is a first LIDAR sensor and the second sensor is a second LIDAR sensor.

Item 26. The non-transitory computer readable medium of any one of Items 15-25, wherein the first configuration parameter is indicative of the first sensor being located on one or more of: a side of the autonomous vehicle, a front of the autonomous vehicle, and a back of the autonomous vehicle.

Item 27. The non-transitory computer readable medium of any one of Items 15-26, wherein in response to determining that the first position parameter is indicative of a non-inverted position, determining the first configuration parameter as indicative of a rotation direction parameter for a clockwise direction.

Item 28. The non-transitory computer readable medium of any one of Items 15-27, wherein in response to determining that the first position parameter is indicative of an inverted position, determining the first configuration parameter as indicative of a rotation direction parameter for a counterclockwise spin.

Item 29. A system, comprising at least one processor; and at least one memory storing instructions thereon that, when executed by the at least one processor, cause the at least one processor to:

obtain first location data of a first sensor associated with an autonomous vehicle;

determine, based on the first location data, a first position parameter indicative of a vertical orientation of the first sensor with respect to a ground level;

determine, based on the first position parameter, a first configuration parameter indicative of a configuration of the first sensor; and operate, based on the first configuration parameter, the first sensor.

Item 30. The system of Item 29, wherein the first configuration parameter comprises one or more of: a rotation direction parameter of the first sensor, a phase parameter of the first sensor, a location parameter of the first sensor, a time offset parameter of the first sensor, a synchronization parameter of the first sensor, a field-of-view parameter of the first sensor, and a field-of-view occlusion parameter of the first sensor.

Item 31. The system of any one of Items 29-30, wherein to operate the first sensor comprises to rotate, based on the first configuration parameter, the first sensor.

Item 32. The system of any one of Items 29-31, wherein the at least one memory storing instructions thereon cause the at least one processor to:

obtain second location data of a second sensor associated with an autonomous vehicle;

determine, based on the second location data, a second position parameter indicative of a vertical orientation of the second sensor with respect to the ground level;

determine, based on the second position parameter, a second configuration parameter indicative of a configuration of the second sensor; and operate, based on the second configuration parameter, the second sensor.

Item 33. The system of Item 32, wherein the second configuration parameter comprises one or more of: a rotation direction parameter of the second sensor, a phase parameter of the second sensor, a location parameter of the second sensor, a time offset parameter of the second sensor, a field-of-view parameter of the second sensor, a synchronization parameter of the second sensor, and a field-of-view occlusion parameter of the second sensor.

Item 34. The system of any one of Items 32-33, wherein to operate the second sensor comprises to rotate, based on the second configuration parameter, the second sensor.

Item 35. The system of any one of Items 32-34, wherein to operate the second sensor comprises to operate, based on the first configuration parameter and second configuration parameter, the second sensor.

Item 36. The system of any one of Items 32-35, wherein to operate the second sensor comprises to synchronize, based on the first configuration parameter and the second configuration parameter, rotation of the second sensor with rotation of the first sensor.

Item 37. The system of any one of Items 32-36, wherein the at least one memory storing instructions thereon cause the at least one processor to:

obtain first sensor data from the first sensor, the first sensor data associated with an environment in which the autonomous vehicle is operating;

obtain second sensor data from the second sensor, the second sensor data associated with the environment; and generate, based on the first sensor data and the second sensor data, a combined sensor view data indicative of the environment.

Item 38. The system of Item 37, wherein the combined sensor view data is indicative of vertical coverage from the ground level to a pre-determined height from the ground level.

Item 39. The system of any one of Items 32-38, wherein the first sensor is a first LIDAR sensor and the second sensor is a second LIDAR sensor.

Item 40. The system of any one of Items 29-39, wherein the first configuration parameter is indicative of the first sensor being located on one or more of: a side of the autonomous vehicle, a front of the autonomous vehicle, and a back of the autonomous vehicle.

Item 41. The system of any one of Items 29-40, wherein in response to determining that the first position parameter is indicative of a non-inverted position, the at least one memory storing instructions thereon cause the at least one processor to determine the first configuration parameter as indicative of a rotation direction parameter for a clockwise direction.

Item 42. The system of any one of Items 29-41, wherein in response to determining that the first position parameter is indicative of an inverted position, the at least one memory storing instructions thereon cause the at least one processor to determine the first configuration parameter as indicative of a rotation direction parameter for a counterclockwise spin.

What is claimed is:

1. A method comprising:

obtaining, using at least one processor, first location data indicative of a first component of an autonomous vehicle on which a first sensor is located;

determining, using the at least one processor, based on the first location data, a first vertical orientation of the first sensor with respect to a ground level;

determining a first rotational direction of the first sensor relative to the ground level based at least in part on the first vertical orientation of the first sensor;

receiving from a second sensor a second configuration parameter indicative of a second rotational direction of the second sensor relative to the ground level based at least in part on a second vertical orientation of the second sensor to enable synchronization with respect to the second sensor, wherein the second sensor is located on a second component of the autonomous vehicle, different from the first component;

automatically adjusting the first rotational direction of the first sensor based on the second rotational direction of the second sensor and the first vertical orientation of the first sensor; and synchronously operating, using the at least one processor, the first sensor and the second sensor.

2. The method of claim 1, the method further comprising:

obtaining, using the at least one processor, second location data of the second sensor indicative of the second component;

determining, using the at least one processor, based on the second location data, the second vertical orientation of the second sensor with respect to the ground level; and determining, using the at least one processor the second configuration parameter based on the second vertical orientation of the second sensor.

3. The method of claim 2, wherein operating the second sensor comprises operating the second sensor based on the first vertical orientation of the first sensor and the second configuration parameter.

4. The method of claim 2, wherein synchronously operating the second sensor and the first sensor comprises synchronously rotating the second sensor and the first sensor.

5. The method of claim 2, further comprising:

obtaining, using the at least one processor, first sensor data from the first sensor, the first sensor data associated with an environment in which the autonomous vehicle is operating;

obtaining, using the at least one processor, second sensor data from the second sensor, the second sensor data associated with the environment; and generating, using the at least one processor, based on the first sensor data and the second sensor data, a combined sensor view data indicative of the environment.

6. The method of claim 5, wherein the combined sensor view data is indicative of vertical coverage from the ground level to a pre-determined height from the ground level.

7. The method of claim 2, wherein the first sensor is a first LIDAR sensor and the second sensor is a second LIDAR sensor.

8. The method of claim 1, wherein the first location data is indicative of the first sensor being located on one or more of: a side of the autonomous vehicle, a front of the autonomous vehicle, and a back of the autonomous vehicle.

9. The method of claim 1, further comprising:

determining that the first vertical orientation of the first sensor is indicative of a non-inverted position; and in response to determining that the first vertical orientation of the first sensor is indicative of a non-inverted position, determining the first rotational direction as a clockwise direction.

10. The method of claim 1, further comprising:

determining that the first vertical orientation of the first sensor is indicative of an inverted position; and in response to determining that the first vertical orientation of the first sensor is indicative of an inverted position, determining the first rotational direction as a counterclockwise direction.

11. A non-transitory computer readable medium comprising instructions stored thereon that, when executed by at least one processor, cause the at least one processor to carry out operations comprising:

obtaining, using at least one processor, first location data indicative of a first component of an autonomous vehicle on which a first sensor is located;

determining, using the at least one processor, based on the first location data, a first vertical orientation of the first sensor with respect to a ground level;

determining a first rotational direction of the first sensor relative to the ground level based at least in part on the first vertical orientation of the first sensor;

receiving from a second sensor a second configuration parameter indicative of a second rotational direction of the second sensor relative to the ground level based at least in part on a second vertical orientation of the second sensor to enable synchronization with respect to the second sensor, wherein the second sensor is located on a second component of the autonomous vehicle, different from the first component;

automatically adjusting the first rotational direction of the first sensor based on the second rotational direction of the second sensor and the first vertical orientation of the first sensor; and synchronously operating, using the at least one processor, the first sensor and the second sensor.

12. A system, comprising at least one processor; and at least one memory storing instructions thereon that, when executed by the at least one processor, cause the at least one processor to:

obtain, using at least one processor, first location data indicative of a first component of an autonomous vehicle on which a first sensor is located;

determine, using the at least one processor, based on the first location data, a first vertical orientation of the first sensor with respect to a ground level;

determine a first rotational direction of the first sensor relative to the ground level based at least in part on the first vertical orientation of the first sensor;

receive from a second sensor a second configuration parameter indicative of a second rotational direction of the second sensor relative to the ground level based at least in part on a second vertical orientation of the second sensor to enable synchronization with respect to the second sensor, wherein the second sensor is located on a second component of the autonomous vehicle, different from the first component;

automatically adjust the first rotational direction of the first sensor based on the second rotational direction of the second sensor and the first vertical orientation of the first sensor; and synchronously operate, using the at least one processor, the first sensor and the second sensor.

13. The system of claim 12, wherein the at least one memory storing instructions thereon further cause the at least one processor to:

obtain, using the at least one processor, second location data of the second sensor indicative of the second component;

determine, using the at least one processor, based on the second location data, the second vertical orientation of the second sensor with respect to the ground level; and determine, using the at least one processor, based on the second vertical orientation of the second sensor, the second configuration parameter.

14. The system of claim 13, wherein to operate the second sensor, the instructions, when executed by the at least one processor, cause the at least one processor to operate the second sensor based on the first vertical orientation of the first sensor and second configuration parameter.

15. The system of claim 13, wherein to operate the second sensor, the instructions, when executed by the at least one processor, cause the at least one processor to synchronously rotate the second sensor and the first sensor.

16. The system of claim 13, wherein the instructions, when executed by the at least one processor, further cause the at least one processor to:

obtain, using the at least one processor, first sensor data from the first sensor, the first sensor data associated with an environment in which the autonomous vehicle is operating;

obtain, using the at least one processor, second sensor data from the second sensor, the second sensor data associated with the environment; and generate, using the at least one processor, based on the first sensor data and the second sensor data, a combined sensor view data indicative of the environment.

17. The system of claim 16, wherein the combined sensor view data is indicative of vertical coverage from the ground level to a pre-determined height from the ground level.

18. The system of claim 13, wherein the first sensor is a first LIDAR sensor and the second sensor is a second LIDAR sensor.

\* \* \* \* \*